US008157287B1

(12) United States Patent
Cleveland et al.

(10) Patent No.: US 8,157,287 B1
(45) Date of Patent: Apr. 17, 2012

(54) CONVERTIBLE WHEELCHAIR

(76) Inventors: Valerie N. Cleveland, Rocky Mount, NC (US); Gerlene C. Borum, Rocky Mount, NC (US)

( * ) Notice: Subject to any disclaimer, the term of this patent is extended or adjusted under 35 U.S.C. 154(b) by 0 days.

(21) Appl. No.: 13/252,907

(22) Filed: Oct. 4, 2011

Related U.S. Application Data

(60) Provisional application No. 61/405,469, filed on Oct. 21, 2010.

(51) Int. Cl.
*B62B 7/12* (2006.01)
*B60N 2/34* (2006.01)
*B60N 2/02* (2006.01)

(52) U.S. Cl. .......... 280/648; 280/30; 280/643; 280/644; 280/650; 280/47.38; 297/354.13; 297/377; 297/284.3; 297/230.14; 297/183.4

(58) Field of Classification Search .................... 280/30, 280/642, 643, 644, 647, 648, 650, 658, 47.34, 280/47.38, 47.4, 47.41; 297/354.13, 377, 297/284.3, 284.9, 230.14, 183.4, 183.6, 183.7
See application file for complete search history.

(56) References Cited

U.S. PATENT DOCUMENTS

| | | | | |
|---|---|---|---|---|
| 352,723 | A * | 11/1886 | Weeden | 297/112 |
| 1,366,274 | A * | 1/1921 | Orth | 297/344.15 |
| 2,383,340 | A | 8/1945 | Pezzano | |
| 3,138,805 | A * | 6/1964 | Piazza | 5/618 |
| 3,227,467 | A * | 1/1966 | Fugitt, Sr. | 280/47.25 |
| 3,284,126 | A * | 11/1966 | Piazza | 296/20 |
| 4,496,189 | A * | 1/1985 | Tanizaki et al. | 297/63 |
| 4,691,962 | A | 9/1987 | Holdt | |
| 4,717,169 | A | 1/1988 | Shaffer | |
| 4,997,200 | A | 3/1991 | Earls | |
| 5,179,745 | A * | 1/1993 | Hebert et al. | 5/620 |
| 5,423,592 | A * | 6/1995 | Spurrier et al. | 297/129 |
| 5,584,082 | A * | 12/1996 | Crawford et al. | 5/86.1 |
| 5,659,910 | A * | 8/1997 | Weiss | 5/618 |
| 5,782,483 | A * | 7/1998 | Rogers et al. | 280/642 |
| 5,803,544 | A * | 9/1998 | Block et al. | 297/284.3 |
| 5,860,664 | A * | 1/1999 | Smith | 280/250.1 |
| 6,227,559 | B1 * | 5/2001 | Slagerman et al. | 280/650 |
| 6,499,163 | B1 | 12/2002 | Stensby | |
| 6,550,802 | B2 * | 4/2003 | Sheehan | 280/658 |
| 6,695,410 | B2 * | 2/2004 | Hsia | 297/452.4 |
| 6,773,059 | B2 * | 8/2004 | Volotsenko | 297/129 |
| 6,802,563 | B1 * | 10/2004 | Mysliwiec et al. | 297/284.9 |
| 6,890,031 | B2 * | 5/2005 | Rhein | 297/284.9 |
| 7,093,904 | B1 * | 8/2006 | McMillen | 297/411.37 |
| 7,207,622 | B2 * | 4/2007 | Cohan et al. | 297/31 |
| 7,631,935 | B2 * | 12/2009 | Chen et al. | 297/284.9 |
| 7,631,940 | B1 * | 12/2009 | Jager | 297/344.18 |
| 7,713,220 | B2 * | 5/2010 | Chen | 601/99 |
| 7,988,237 | B2 * | 8/2011 | Peters | 297/463.2 |
| 8,002,349 | B1 * | 8/2011 | Pizzuto | 297/217.3 |
| 2005/0179291 | A1 * | 8/2005 | Brodeur | 297/284.9 |

* cited by examiner

*Primary Examiner* — John R Olszewski
(74) *Attorney, Agent, or Firm* — Richard C. Litman

(57) ABSTRACT

The convertible wheelchair includes a seat and a plurality of chair legs extending downward from the seat. Each leg includes a wheel to permit movement of the convertible wheelchair. A reclining backrest is pivotally mounted to the back of the wheelchair, which provides a flat, horizontal surface for a user to rest thereon. Both the seat and the backrest include a pair of panels selectively extendable towards the lateral side in order to form a bed. In this configuration, a caregiver can easily maneuver the user into any position required for ablutions and lavatory functions. Each panel and the handlebars on the backrest may include extendable legs to stabilize the bed.

8 Claims, 4 Drawing Sheets

CONVERTIBLE WHEELCHAIR

CROSS-REFERENCE TO RELATED APPLICATION

This application claims the benefit of U.S. Provisional Patent Application Ser. No. 61/405,469, filed Oct. 21, 2010.

BACKGROUND OF THE INVENTION

1. Field of the Invention

The present invention relates to personal assistance devices, and more specifically to a convertible wheelchair having expandable panels for converting a wheelchair into a bed so that a patient may be laid prone for easy handling by a caregiver.

2. Description of the Related Art

In the medical field, several types of conveyances or conveyance devices are utilized to transport the infirm, geriatric or patient from one location to another. One of these types of devices is the well-known wheelchair. Most wheelchairs basically comprise a chair on wheels that can be manually propelled, motor operated or require an assistant to push the wheelchair along. These conveyances are a great benefit to the caregiver or medical staff in most situations, but they can be potential hindrances in times of emergencies or general hygiene. In emergency situations, any loss of time due to handling and removing the injured from a wheelchair can be potentially fatal, especially when the injured is in a sitting position. In situations where a caregiver must assist the infirm or geriatric with hygienic functions such as elimination of bodily wastes or bathing, maneuvering the patient in and out of a wheelchair can be an awkward and strenuous exercise, which can lead to potentially embarrassing moments.

One of the solutions to the above involves a reclining wheelchair where the backrest can be unfolded to provide a surface for the patient to lie flat. This works well when it is required to have the patient prone on the patient's back, but it is difficult to roll the patient over when access to the back of the patient is needed. In light of the above, it would be a benefit in the art of medical care to provide a wheelchair that facilitates easier handling of the patient.

Thus, a convertible wheelchair solving the aforementioned problems is desired.

SUMMARY OF THE INVENTION

The convertible wheelchair includes a seat and a plurality of chair legs extending downward from the seat. Each leg includes a wheel to permit movement of the convertible wheelchair. A reclining backrest is pivotally mounted to the back of the wheelchair. The backrest provides a flat, horizontal surface for a user to rest thereon. Both the seat and the backrest include a pair of panels selectively extendable towards the lateral side in order to form a bed. In this configuration, a caregiver can easily maneuver the user into any position required for ablutions and lavatory functions. Each panel and the handlebars on the backrest may include extendable legs to stabilize the bed.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
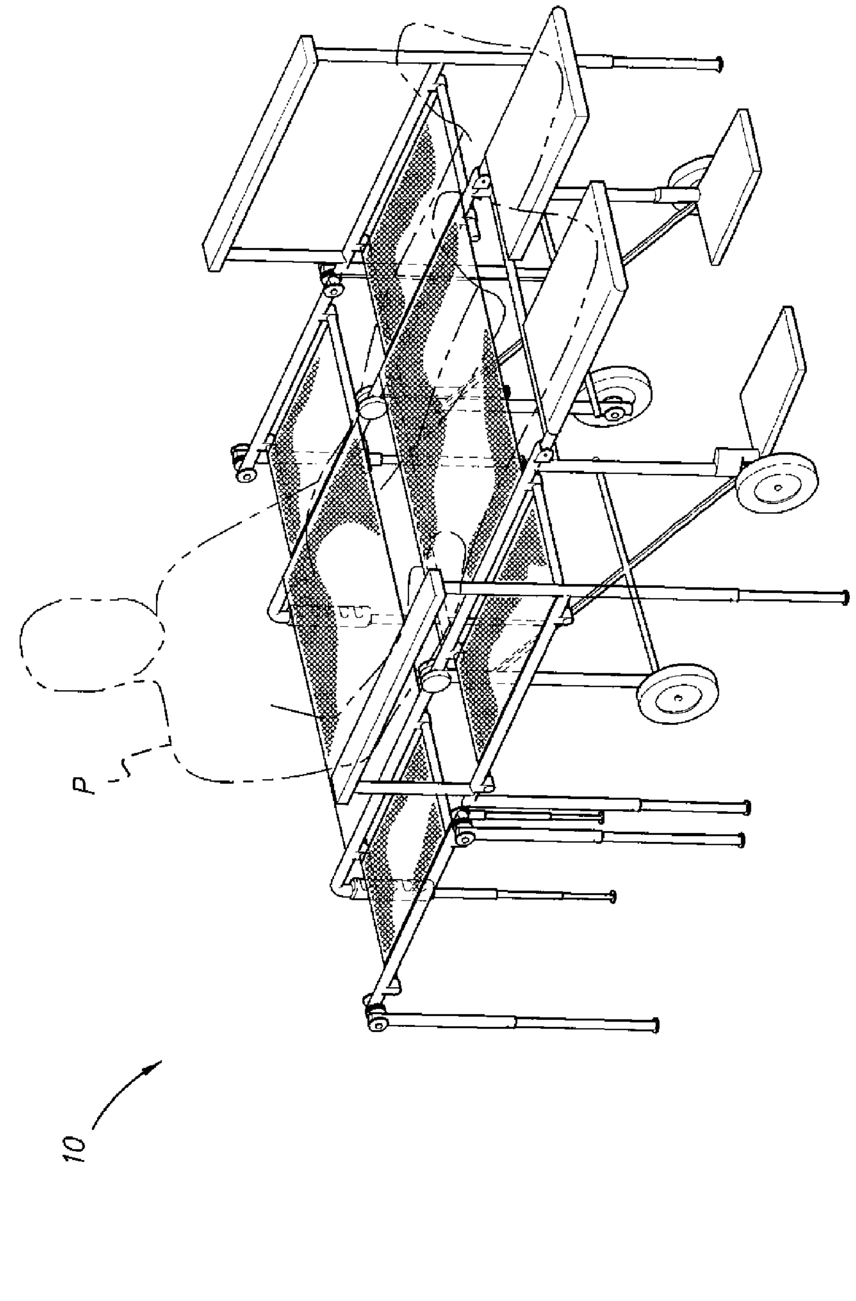
FIG. 1 is an environmental, perspective view of a convertible wheelchair according to the present invention, shown with the panels extended for use with the occupant lying down.
Figure 2:
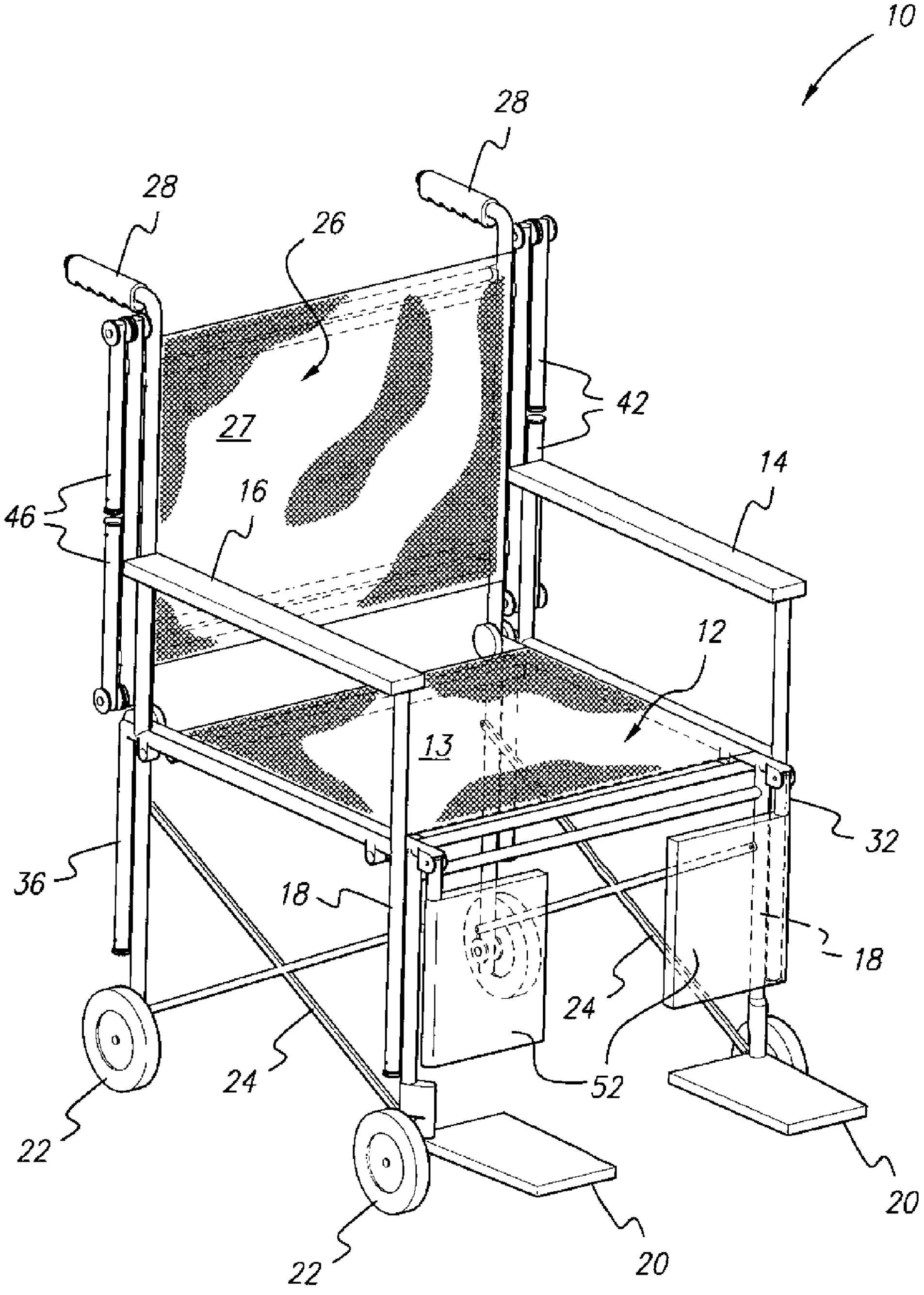
FIG. 2 is a perspective view of the convertible wheelchair according to the present invention, shown with the panels retracted for use as a conventional wheelchair.
Figure 3:
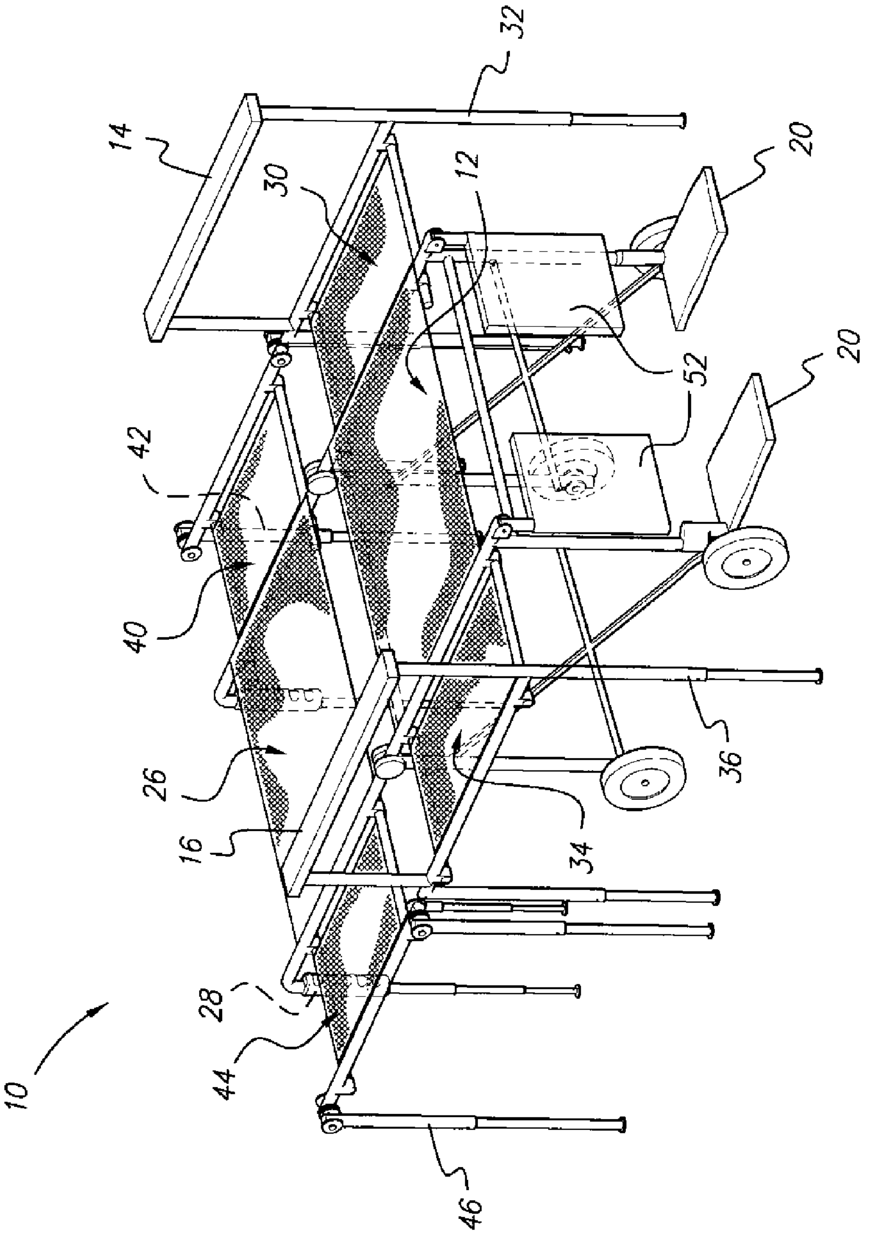
FIG. 3 is a perspective view of the convertible wheelchair of FIGS. 1 and 2, shown in the fully converted position.

The present invention relates to a convertible wheelchair, generally referred to by reference number 10 in the drawings, which can be converted from a regular wheelchair to a bed or platform for easy handling and maneuvering of an infirm, geriatric or patient P. As shown in FIGS. 1-3, the convertible wheelchair 10 includes a chair frame with a seat 12, a backrest 26, handles or handlebars 28, and wheels 22 operatively attached to chair legs 18. Preferably, at least the front pair of wheels 22 self-align for ease in maneuvering the convertible wheelchair 10 to a desired destination or location. Left and right armrests 14, 16 are disposed on lateral sides of the seat 12 to provide some comfort for the patient's arms. The seat 12 includes a panel or sheet 13 made from resilient fabric, such as imitation leather or cloth, that provides comfort and is safe for medical use. Similarly, the backrest 26 also includes a panel or sheet 27 made from the same material. Both the seat 12 and the backrest 26 may also include cushions or any other deformable material for added comfort.

The front pair of legs 18, 18 may include selectively deployable footrests 20 for the patient. These footrests 20 may swivel, fold or both into place with respect to the legs 18. As an alternative, each of the footrests 20 can be selectively extended, via e.g., a pivoting mechanism, so that the footrest 20 is level with the seat 12 when it is required to keep the patient's leg in an elevated position. A crossbeam or brace 24 is disposed between adjacent legs 18 to provide structural strength and stability to the convertible wheelchair 10.

The convertible wheelchair 10 also includes a further support for the patient's leg in the form of a lower leg support 52. The lower leg support 52 may be selectively deployed, e.g., by a pivoting mechanism, between the positions shown in FIGS. 1 and 2. The lower leg support 52 includes a panel that can be pivoted into a position supporting the back of the lower leg as shown in the drawings or an out of the way position when the use thereof is not required.

To convert the convertible wheelchair 10 into a bed or platform, both the backrest 26 and the seat 12 include extendable panels that increase the area on which the patient may rest. The backrest 26 is pivotally mounted to the seat 12, and prior to extending the panels, the caregiver reclines the backrest 26 in a manner similar to that taught by U.S. Pat. No. 4,997,200, which is hereby incorporated by reference in its entirety. In this position, the caregiver can selectively extend panels laterally to increase the support surface for the patient and thereby form a bed.

As shown in FIG. 3, the seat 12 includes a left extendable panel 30 and a right extendable panel 34 attached to the respective armrests 14 and 16. Each panel 30, 34 may be mounted to slidable frames so that pulling or pushing of the armrests 14, 16 will extend or retract the panel 30 or 34. Once the panels 30, 34 have been extended, the resultant support surface must be stabilized. In that regard, each armrest 14, 16 includes respective telescoping legs 32, 36 that can be selectively deployed to stabilize the panels 30, 34 with respect to the floor.

Figure 4:
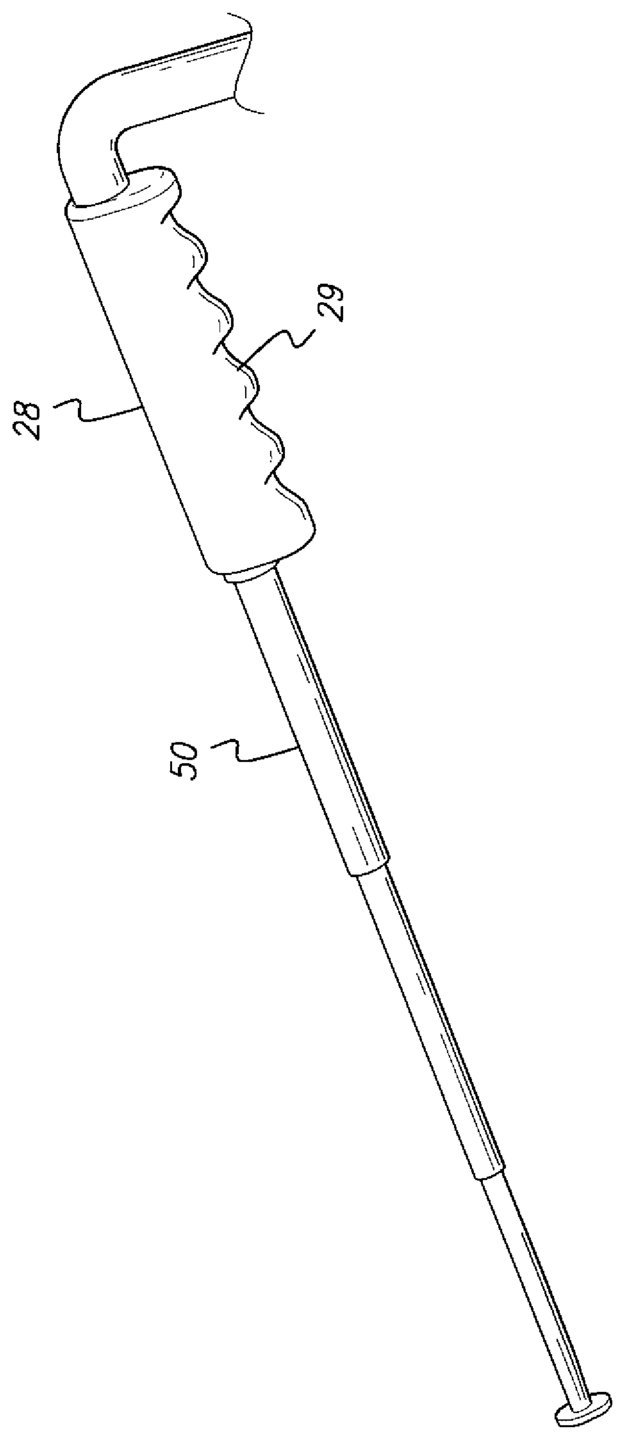
FIG. 4 is a partial perspective view of the convertible wheelchair of FIGS. 1-3, showing an enlarged view of a handlebar assembly.

In a similar manner, the backrest 26 includes a left extendable panel 40 and a right extendable panel 44. Each panel 40, 44 includes slidable frames mounted to the back of the backrest 26 so that the caregiver can easily pull the panels out from the lateral sides of the backrest 26. Once deployed, the panels 40, 44 are stabilized with respect to the floor by respective telescoping legs 42 and 46. The legs 42, 46 are pivotally mounted to the respective panels 40, 44 so that, when not in use, the legs 42, 46 may be pivoted into a stowed position, as shown in FIG. 2. As shown in FIG. 4, the each handlebar 28 houses a telescoping leg 50 to stabilize the backrest 26 when the backrest 26 is reclined. The handlebars 28 may also include an ergonomic grip 29.

In use, the convertible wheelchair 10 may have all the panels 30, 84, 40, 44 pulled out to provide a stable bed for the patient P. In this configuration, the armrests 14, 16 serve as bed guards. Once the patient P is reclined, the patient P is in an easier position for the caregiver to assist the patient P use the lavatory facilities and clean up afterwards. In more dire situations, the patient P is in a more medically stable position for the medical staff, and the patient P can be more easily moved, e.g., rolled over or lifted, as required for a particular procedure.

Thus, it can be seen that the convertible wheelchair 10 minimizes the usual time associated with getting the patient in and out of a typical wheelchair, and thereby minimizes accidents that can occur with incontinent patients. Moreover, the ready bed configuration helps medical staff to quickly perform life saving procedures in emergency situations.

It is to be understood that the convertible wheelchair 10 encompasses a variety of alternatives. For example, the deployment of the seat and backrest panels may be facilitated by pivotal frames. Moreover, the armrests may be selectively removed to provide an uninterrupted support surface.

It is to be understood that the present invention is not limited to the embodiments described above, but encompasses any and all embodiments within the scope of the following claims.

We claim:

1. A convertible wheelchair, comprising:

a chair frame a seat attached to the frame;

a reclining backrest attached to the seat;

handles extending from behind the backrest;

armrests disposed on lateral sides of the seat;

a plurality of chair legs extending below the seat;

wheels operatively attached to the chair legs;

footrests on at least two of the chair legs;

a first extendable panel and a second extendable panel attached to the seat, each of the panels being slidably extendable by pulling the armrest from a respective lateral side of the seat; and a third extendable panel and a fourth extendable panel attached to the backrest, the third and fourth panels being extendable in lateral directions;

wherein extension of the first and second extendable panels of the seat and the third and fourth extendable panels of the backrest when the backrest is reclined forms a bed for a patient to lie down on in order to facilitate easy handling of the patient by a caregiver.

2. The convertible wheelchair of claim 1, wherein each said handle comprises a gripping portion and an extendable leg for stabilizing said backrest with respect to a support surface when said backrest is fully reclined.

3. The convertible wheelchair of claim 1, wherein each said armrests further comprises at least one extendable leg, the extendable leg having a telescoping section for adjustably setting the extension of the extendable leg with respect to a support surface.

4. The convertible wheelchair of claim 1, wherein each said third and fourth extendable panels comprises a pivotable, extendable leg disposed on opposite ends of each said first and second panels, the extendable legs being selectively deployed to stabilize the extended backrest with respect to a support surface and pivoted back into a stowed position.

5. The convertible wheelchair of claim 4, wherein each said pivotable legs comprises a telescoping section for adjustably setting the extension of said pivotable leg.

6. The convertible wheelchair of claim 1, further comprising a lower leg support pivotally mounted adjacent each said chair legs having said footrests, the lower leg support selectively supporting the lower leg of the patient both in a seated position and a reclined position.

7. The convertible wheelchair of claim 6, wherein each said lower leg supports comprises a pivotable panel, the pivotable panel being selectively pivoted between a support position and a non-support position.

8. The convertible wheelchair of claim 1, wherein each said first, second, third and fourth panels comprises a sub-frame having support material attached thereon to form a supporting surface for the patient.

* * * * *